(12) United States Patent
Chauvel et al.

(10) Patent No.: US 6,606,687 B1
(45) Date of Patent: Aug. 12, 2003

(54) OPTIMIZED HARDWARE CLEANING FUNCTION FOR VIVT DATA CACHE

(75) Inventors: Gerard Chauvel, Antibes (FR); Serge Lasserre, Frejus (FR); Dominique Benoit Jacques D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/447,194

(22) Filed: Nov. 22, 1999

(51) Int. Cl.[7] .............................................. G06F 12/00
(52) U.S. Cl. ........................ 711/133; 710/260; 365/236
(58) Field of Search .......................... 365/236; 711/117, 711/118, 133, 134, 135, 141, 145, 203, 219; 710/260

(56) References Cited

U.S. PATENT DOCUMENTS

| | | | | |
|---|---|---|---|---|
| 5,515,522 A | * | 5/1996 | Bridges et al. | 711/118 |
| 5,542,062 A | * | 7/1996 | Taylor et al. | 711/118 |
| 5,668,968 A | * | 9/1997 | Wu | 711/122 |
| 5,809,560 A | * | 9/1998 | Schneider | 711/202 |
| 5,913,226 A | * | 6/1999 | Sato | 711/141 |
| 5,915,262 A | * | 6/1999 | Bridgers et al. | 711/118 |
| 6,115,777 A | * | 9/2000 | Zahir et al. | 710/260 |
| 6,321,299 B1 | * | 11/2001 | Chauvel et al. | 711/129 |
| 6,341,324 B1 | * | 1/2002 | Caulk et al. | 710/260 |
| 6,397,302 B1 | * | 5/2002 | Razdan et al. | 711/134 |
| 6,412,043 B1 | * | 6/2002 | Chopra et al. | 711/118 |

* cited by examiner

*Primary Examiner*—Donald Sparks
*Assistant Examiner*—Christian P. Chace
(74) *Attorney, Agent, or Firm*—Gerald E. Laws; W. James Brady, III; Frederick J. Telecky, Jr.

(57) ABSTRACT

A VIVT (virtual index, virtual tag) cache (18) uses an interruptible hardware clean function to clean dirty entries in the cache during a context switch. A MAX counter (82) and a MIN register (84) define a range of cache locations which are dirty. During the hardware clean function, the MAX counter (82) counts downward while cache entries at the address given by the MAX counter (82) are written to main memory (16) if the entry is marked as dirty. If an interrupt occurs, the MAX counter is disabled until a subsequent clean request is issued after the interrupt is serviced.

4 Claims, 5 Drawing Sheets

OPTIMIZED HARDWARE CLEANING FUNCTION FOR VIVT DATA CACHE

CROSS-REFERENCE TO RELATED APPLICATIONS

This application is related to U.S. Ser. No. 09/187,118, filed Nov. 5, 1998, entitled "Computer Circuits, Systems, and Methods Using Partial Cache Cleaning" to Chauvel et al.

STATEMENT OF FEDERALLY SPONSORED RESEARCH OR DEVELOPMENT

Not Applicable

BACKGROUND OF THE INVENTION

1. Technical Field

This invention relates in general to computer systems and, more particularly, to a method and apparatus for a hardware cleaning function for a virtual index, virtual tag cache memory systems.

2. Description of the Related Art

Many multi-tasking computer systems make use of a virtual index, virtual tag (VIVT) cache memory architecture. Most computer systems, and in particular those systems embedded within portable solutions, are designed to support a high MIPS (millions of instructions per second) demand while maintaining power consumption at reasonable rates. Relatively small memory caches, accessed in a single processor cycle, allow a high level of performance while running with main memories at lower speed.

While, formerly, computer systems operated on a single application at one time, computer systems of today generally have several applications loaded into their main memories. The scheduling of multiple applications, running in parallel for the user, is managed by an operating system (OS). Most modern operating systems are designed with the concept of a virtual environment. Addresses coming from the processor are virtual address which map to actual ("physical") addresses in main memory. Cache memories using virtual indices and virtual tags are the most efficient structures for a virtual environment.

For these multi-tasking systems, an important constraint is the context switch. The context switch corresponds to the necessary sequence of actions that the OS needs to execute in order to accommodate several independent tasks on a single processor. The context switch is a limiting factor on the performance in systems with strong real-time requirements, because it takes a significant time and number of instruction to realize the context switch.

Multitasking systems in a virtual environment must deal with "aliasing" of data which can occur when two or more different tasks cache data associated with the same physical address at two or more respective locations in the cache in accordance with the different virtual addresses used by the various tasks. When one task changes the value associated with a cached data item, that change will not be reflected in the cache locations of other virtual addresses which pint to the same physical memory address. As part of a context switch, the operating system must invalidate the content of the cache so that other tasks will see the new value.

The cleaning function associated with invalidating the cache can be very time consuming. Further, the cleaning function may be interrupted only at discrete time intervals, depending upon the cache cleaning design. For many applications which have tight real-time constraints, it is important that interrupts be allowed frequently. However, cleaning routings which have capacity to allow interrupts at frequent intervals often are the least efficient in completing the cleaning operation.

Therefore, a need has arisen for a high efficiency method and apparatus for cleaning a VIVT cache system which allows frequent interrupts.

BRIEF SUMMARY OF THE INVENTION

The present invention provides a method and apparatus for performing a cache clean function in a system with a cache memory and a main memory. Address circuitry outputs a series of cache addresses in a predetermined order within a range of potentially dirty cache addresses. Control logic circuitry writes information from cache addresses associated with the output from said address circuitry to corresponding main memory locations for each dirty cache location. The address circuitry may be enabled and disabled responsive to either the detection of an interrupt or upon completion of writing all dirty entries to the main memory, such that the clean function can continue by enabling said address circuitry after an interrupt.

The present invention provides significant advantages over the prior art. First, the invention has the benefit of the speed of a hardware cache instruction; after the initial invocation of the hardware clean operation, software is involved only if an interrupt occurs. Second, the hardware cleaning operation may be interrupted as it cycles through the cache entries, allowing the system to respond to interrupts as necessary for real-time requirements. Third, the number of cache entries is optimized to service only the range of cache entries which have associated dirty bits.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–6 of the drawings, like numerals being used for like elements of the various drawings.

Figure 1:
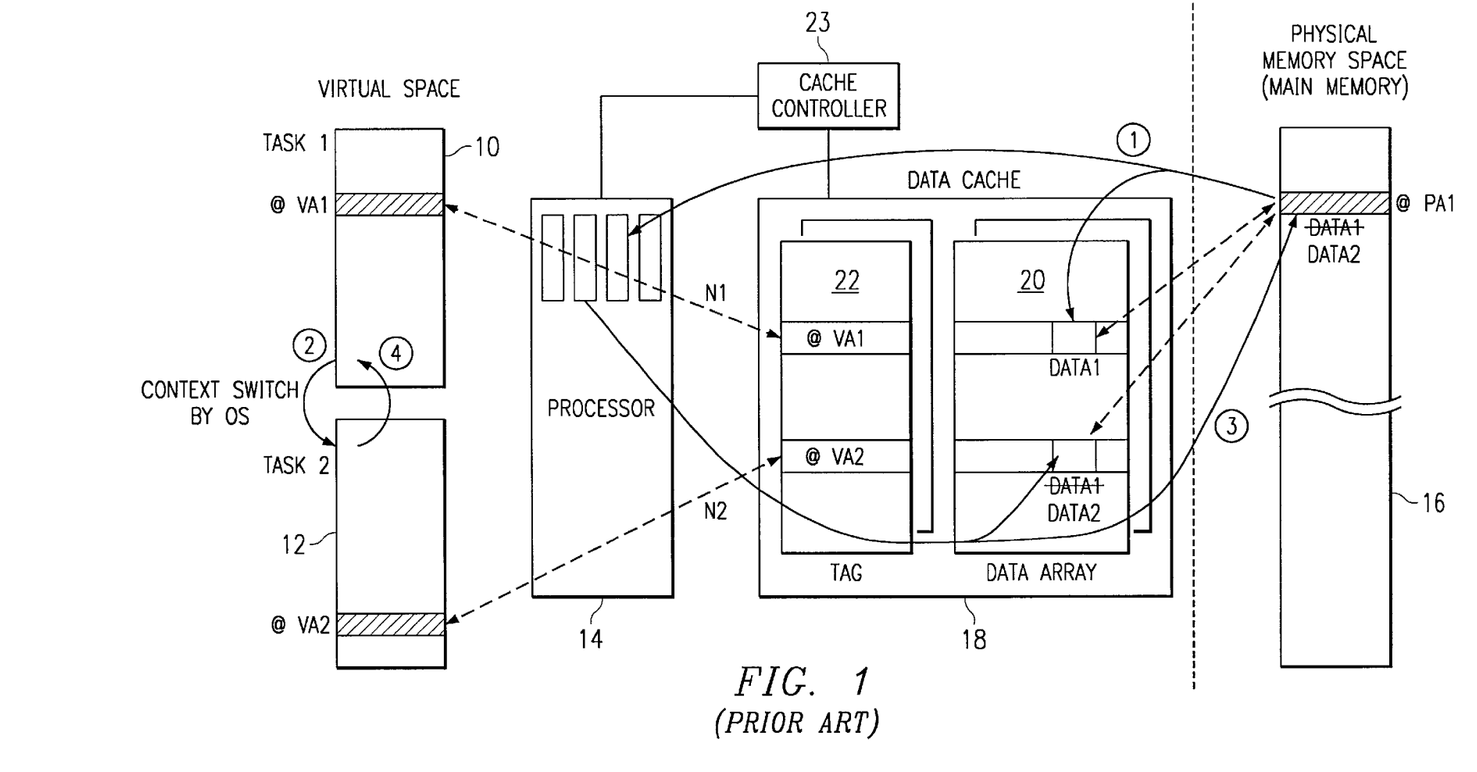
FIG. 1 illustrates a VIVT write through cache architecture and illustrates aliasing problems with the architecture.

FIG. 1 illustrates a block diagram of a multi-tasking computer system which illustrates the problem caused by aliasing. In this scenario, two tasks 10 and 12 are operating independent of one another, each in its own virtual space. The tasks are being executed by a processor (or, in some systems, multiple processors) 14 in a multi-tasking environment. To execute the tasks, the processor 14 retrieves information from and stores information to a physical memory (often referred to as the main memory) 16. Because the processor can generally operate at a speed far in excess of the speed of the main memory, one or more cache memories 18 are often used. In some architectures, both data and instructions are cached in a single cache memory; in the illustrated embodiment, separate data and instruction (not shown) caches are used.

A cache memory acts as an intermediary between the processor 14 and the main memory 16, typically a dynamic random access memory (DRAM). The cache memory, typically a static random access memory (SRAM), is generally significantly smaller than the main memory bank (in terms of storage capacity), but significantly faster. The cache memory retains a portion of the information in the memory bank. When the processor accesses information, the cache memory is checked first to see if the data resides in the cache; if so, a "cache hit" ensues and data is taken from the cache memory which can supply the data at high speed responsive to the memory access request. On the other hand, if the information does not reside in the cache, a "cache miss" ensures and the processor 14 receives the information from the main memory 16; this information is also loaded into the cache memory 18.

Cache architectures often have hit rates in the 90–95% rates, depending upon the application. The actual efficiency depends upon a number of factors, including the caching scheme employed, the size of the cache, and the application being run by the processor. Cache memories thus allow slower, more power efficient, less expensive, memory to store a large amount of data, while storing the portion of the data most likely to be accessed by the processor 14 at any given moment in the high speed cache memory.

As shown in FIG. 1, the cache memory 18 includes a data array 20 (a high speed memory for storing information received from the main memory 16) and a tag memory 22. In a typical cache architecture, a cache controller 23 receives a virtual memory address from the processor 14. The virtual address (VA) corresponds to a physical address (PA) in main memory 16. The cache controller 23 is coupled to tag array 22 and a data array 20. The illustrated cache architecture is arranged as a two-way set associative cache; therefore, both the tag array 22 and the data array 20 have two memory planes, 22a–b and 20a–b, respectively. The outputs of planes 22a and 22b indicate the virtual address being stored at the corresponding position in the respective plane of data array 22a and 22b. These outputs are compared to the requested virtual address to determine whether a hit or a miss occurs.

Data aliasing occurs when multiple tasks access a single physical address in main memory 16 at different virtual addresses and one or more of the tasks modify the information from that physical address. In this case, different locations in the cache memory 18 corresponding to the different virtual addresses associated with the common physical address can contain different values.

An example of aliasing is provided in FIG. 1. When task1 10 reads data from main memory 16 and a miss occurs, the cache controller reads the information (data1) from the main memory 16. Thus if task1 accesses memory at virtual address VA1, corresponding to physical location PA1, the cache controller checks the tag memory 22 at cache location N1 (which corresponds to VA1) to determine if VA1 is cached in data array 20. Assuming it does not, the information from PA1 is retrieved from main memory 16 and cached in the data array at N1.

Assuming the time slice allocated to task1 ends without any modification of the data at VA1, the information in data array 20 at location N1 would still match the data at location PA1 in main memory 16. At the end of the time slice, the processor, under control of the operating system, switches to task2. If task2 makes a memory access to virtual address VA2, which also corresponds to physical address PA1, and a miss occurs, information is retrieved from main memory 16 at address PA1 and is stored at location N2 in cache memory 18. At this point, the data at N1 and N2 are identical.

If task2 writes a value "data2" to main memory 16 at virtual address VA2, the new value data 2 will be written to address N2 in the cache memory 18 and to address PA1 in main memory 16. Address N1, corresponding to virtual address VA1 of task1, will still hold the old data value, data1. When the operating system returns to task1, the value associated with VA1 will now be invalid. Accordingly, as part of the context switch between tasks, the operating system must invalidate the content of the cache so that the cache values are consistent with the main memory for each task.

The cache system described above is a "write-through" cache; information is written to both the data array 20 and the main memory 16. Write-back (or "copy back") caches reduce power consumption and increase speed by writing only to the cache 18 until an event occurs which requires updating the main memory 16.

Figure 2:
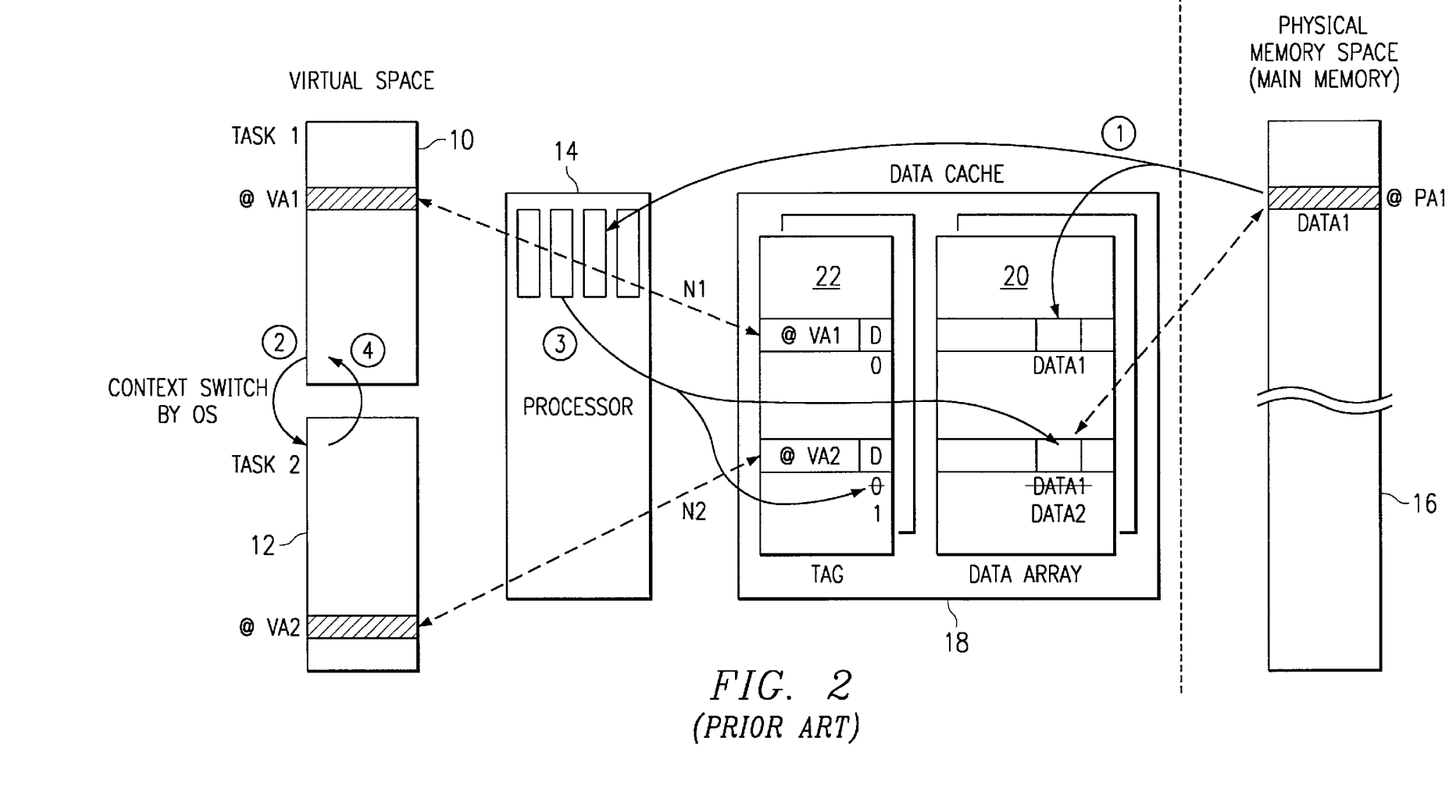
FIG. 2 illustrates a VIVT write-back architecture and illustrates aliasing problems with the architecture.

An example of aliasing in a write-back cache is shown in FIG. 2. In this example, task1 again reads at virtual address VA1 corresponding to physical address PA1, storing the value, data1, in cache location N1. After a context switch, task2 reads at virtual address VA2 corresponding to physical address PA1, storing the value, data1, in cache location N2. New data is written to address VA2, resulting in data2 being stored at location N2 in the cache 18, but physical address PA1 is not updated; therefore, PA1 still holds value data1. The cache controller sets a flag (a "dirty bit") along with the tag at location N2 to indicate that this cache location is not consistent with the main memory 16. This is often referred to as a dirty cache location (indicated by a "D" in the tag memory 20 of FIG. 2).

Cleaning a cache requires that all locations marked as dirty must be written back to the main memory 16. Consequently, the time to execute this operation depends upon the size of the cache memory. Common cache sizes of a few kilobytes require a few tens of thousands of cycles for the cleaning operations.

One solution is to use a hardware clean operation, whereupon the cache is cleaned responsive to a specific instruction. For a eight kilobyte cache and a main memory operating at 100MHz, for example, a hardware clean operation can last as long as 80 microseconds if all cache locations are dirty or it can be significantly less if only a few locations are dirty. During the time of the cleaning operation, however, interrupts are disabled and the latency of the interrupt is proportional to the cache size. In real-time systems where interrupts must be dealt with immediately, the worst case latency can be excessive and noticeably affect the operation of the device.

Figure 3:
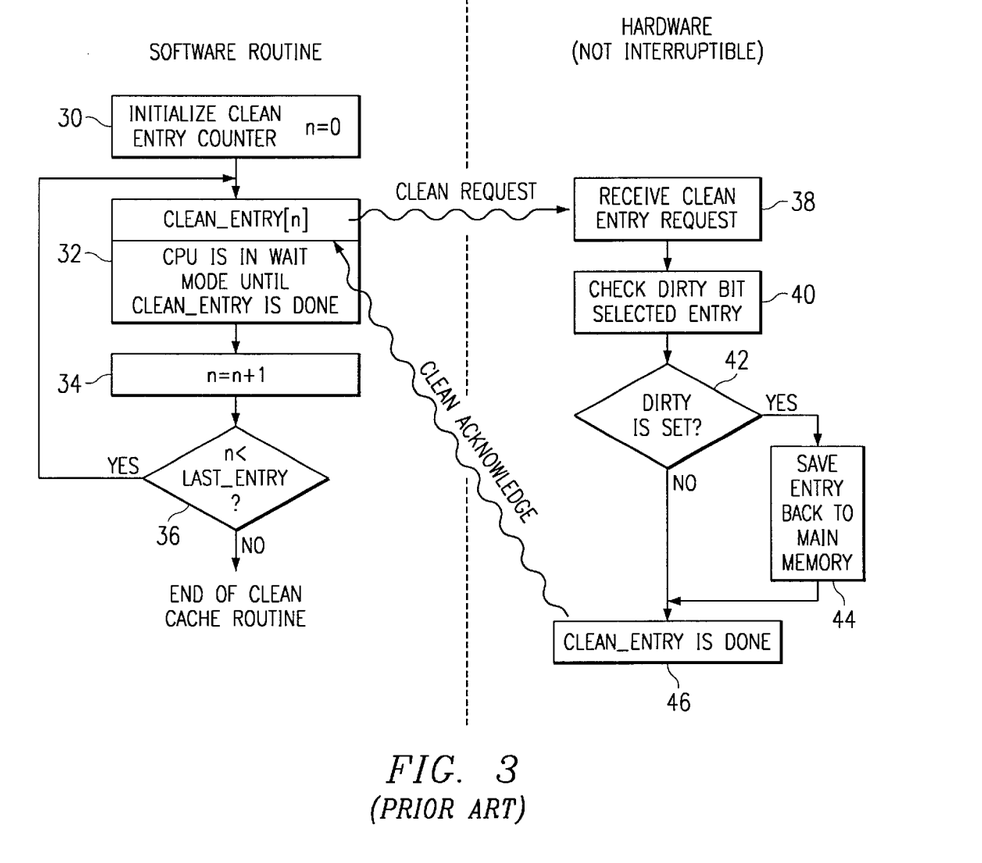
FIG. 3 illustrates a flow chart describing a prior art software clean operation.

FIG. 3 illustrates a flow chart depicting a software solution for cleaning the cache. In step 30, counter n is initialized to n=0. In block 32, the clean entry command is issued, which causes a hardware clean for a single cache memory address. The hardware clean function, which is not interruptible, cleans a block of memory associated with an entry in the tag array corresponding to the value of counter n. The processor is in a wait mode while the cleaning of a block is performed. After the clean function on the block is performed, the counter n is incremented in block 34 and, if n has not reached the last entry in the tag memory 22 (block 36), the steps of blocks 32 and 34 are repeated.

The hardware clean function works as shown in blocks 38 through 40. In block 38, the "clean entry" request is received from the software (block 32). In response to the request, the dirty bit corresponding to tag memory address n is checked to see if it is dirty (block 40). If the dirty bit is set in decision block 42, then the corresponding information in data array 20 at location n is copied to main memory at the physical address corresponding to the virtual address stored in tag memory 22 at location n. Thus, for location n=N2, since the dirty bit is set, the data in data memory 22 at location N2 would be written to physical address PA1. After the entry is saved to main memory 16, or if the dirty bit was not set in decision block 42, the clean function is complete in block 46 and control returns to the software routine.

The software routine in FIG. 3 (i.e., blocks 30–36) can be interrupted between any atomic operation. The hardware routine is not interruptible and therefore, there can be a delay of the order of a few tens of cycles while the hardware routine executes, which is generally acceptable for real-time systems. The main problem with a software cleaning function is that the time required to process the software steps needed to clean a large number of cache locations is excessive, significantly increasing the time required for a context switch. The time to execute a complete cache cleaning operation in the best case is about 50 microseconds, if it is assumed that the cache and processor are running at 100 MHz.

A third implementation is described in connection with French Patent Application No. 9805420, filed Apr. 29, 1998 and U.S. Ser. No. 09/187,118, filed Nov. 5, 1998, entitled "Computer Circuits, Systems, and Methods Using Partial Cache Cleaning" to Chauvel et al, assigned to Texas Instruments Incorporated, which are incorporated by reference herein. In this implementation, information on the uppermost dirty cache location is maintained in order to reduce the number of cache locations which must be cleaned in a hardware clean function. While this architecture improves on the average performance of a hardware clean operation, it does not resolve the real-time issue for worst case scenarios (a wide range of cache blocks dirty) because the hardware operation remains uninterruptible.

Figure 4:
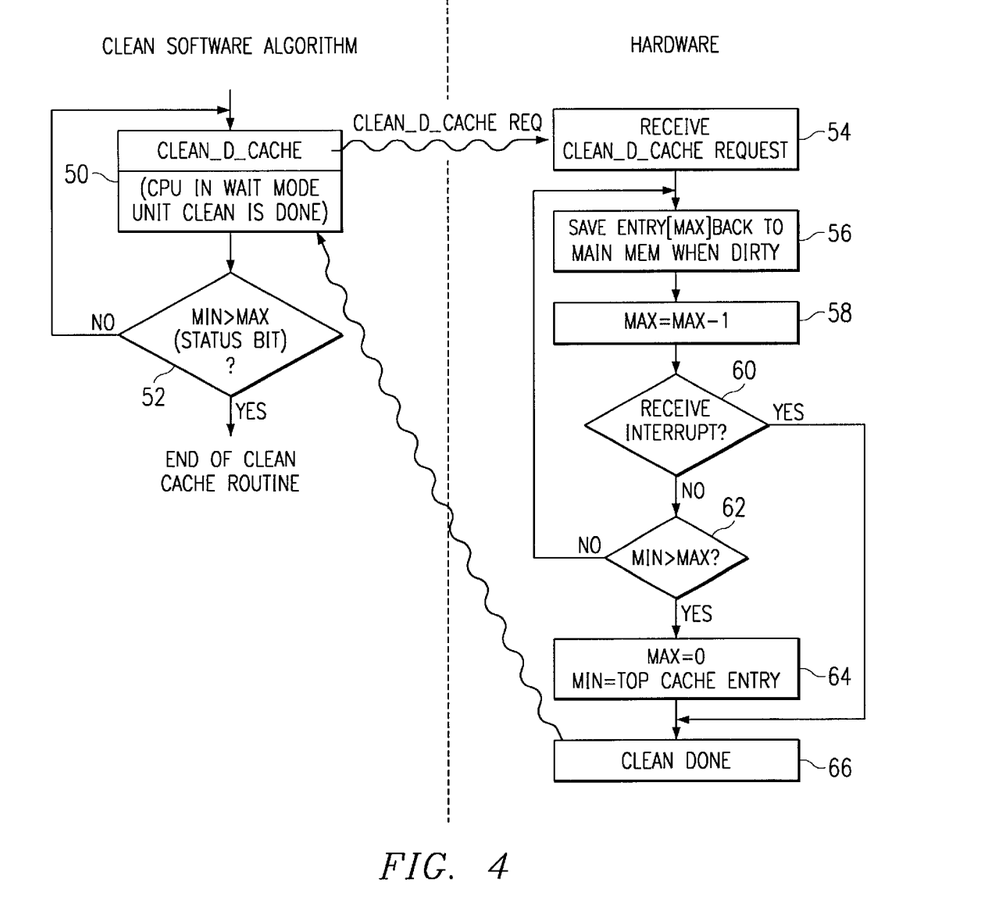
FIG. 4 illustrates a flow chart of an interruptible hardware clean operation.

FIG. 4 illustrates a flow chart describing operation of an interruptible hardware clean operation. The hardware includes a MIN register and a MAX counter. Initially, MIN is set to the highest cache location and MAX is set to the "0". As dirty bits are set in the tag memory 22, the MIN register is loaded with the address (n) of the dirty tag location if n<MIN and MAX is set to the address of the dirty tag location if n>MAX. MIN and MAX thus define the smallest range of addresses in the cache 18 which includes all dirty locations. A MIN>MAX status bit indicates whether the address in the MIN register is greater than the address in the MAX counter at any given time. The MIN>MAX bit can be the most significant bit, the sign bit, of a status register for easy determination of whether the bit is set.

During a context switch, or at other times where a cache clean is necessary, software initiates a hardware clean function in block 50. The CPU is in wait mode until the cleaning control returns from the hardware clean function. As will be described in greater below, the hardware cleaning routine is interruptible and will return control to the software if there is an interrupt or if the clean operation is complete. After the "end" of the hardware clean function (which can occur if there is an interrupt or when all dirty cache locations have been written to main memory), flow continues to block 52, the software checks to see if the MIN>MAX status bit is set. If so, this indicates that the cleaning operation is complete (or that there were no dirty cache locations to clean when the hardware clean operation was invoked) and the context switch may continue. If MIN>MAX is not set, then the hardware cleaning operation was interrupted, and control returns to block 50, where the hardware cleaning function is continued.

The hardware cleaning function is described in connection with blocks 54–66. In block 54, the cache cleaning request is received by the hardware cleaning function. In block 56, the cache entry indicated by counter MAX is saved to main memory if the dirty bit associated with the cache entry is set. In block 58, MAX is decremented.

At this point, as shown by decision block 60, an pending interrupts may be serviced. If an interrupt has not been received, decision block 62 returns to save the next entry in block 56 if MIN is still less than or equal to MAX. If MIN is greater than MAX, i.e., if the MIN>MAX status bit is set, then the cleaning operation is complete. In this case, the MIN and MAX registers are returned to their default settings (MAX=0, MIN=top cache entry) in block 64, the clean operation is complete in block 66 and control returns to the software routine in block 52.

Returning to decision block 60, if an interrupt has been received at this point, the flow is directed to block 66, where the clean operation is temporarily complete and controls returns to the operating system software to service the interrupt. After the interrupt has been serviced, decision block 52 determines whether the MIN>MAX status bit is set. If the bit is not set, then the cleaning operation did not clean all dirty cache entries due to an interrupt. The hardware clean cache instruction is re-invoked, where it will start with the current value of MAX and continue to count down until either another interrupt occurs or until MIN is greater than MAX.

The cache cleaning method described by FIG. 4 provides significant advantages over the prior art. First, the implementation has the benefit of the speed of a hardware cache instruction; after the initial invocation of the hardware clean operation, software is involved only is an interrupt occurs. On the other hand, the hardware cleaning operation may be interrupted as it cycles through the cache entries, allowing the system to respond to interrupts as necessary for real-time requirements. Third, the number of cache entries is optimized to service only the range of cache entries which have associated dirty bits.

Figure 5:
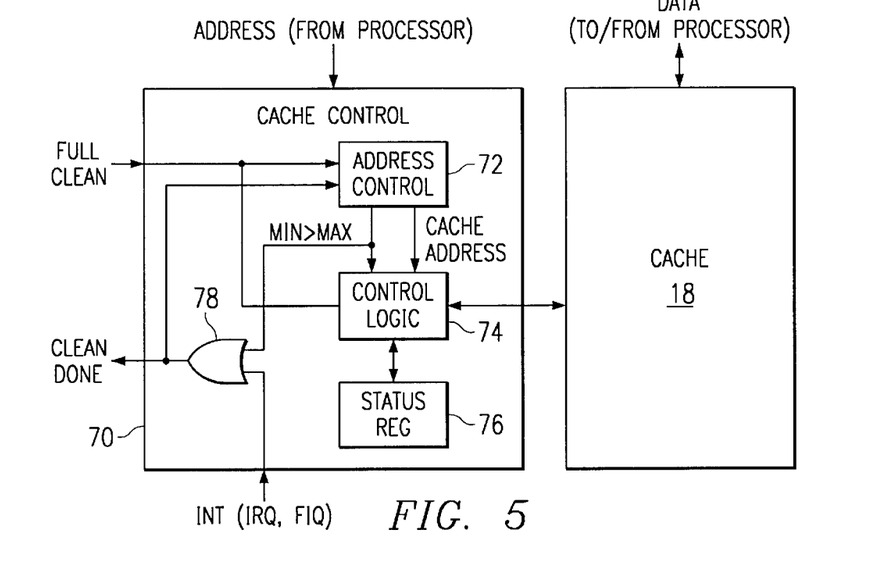
FIG. 5 illustrates a block diagram of a cache controller which performs the hardware clean operation of FIG. 4.
Figure 6:
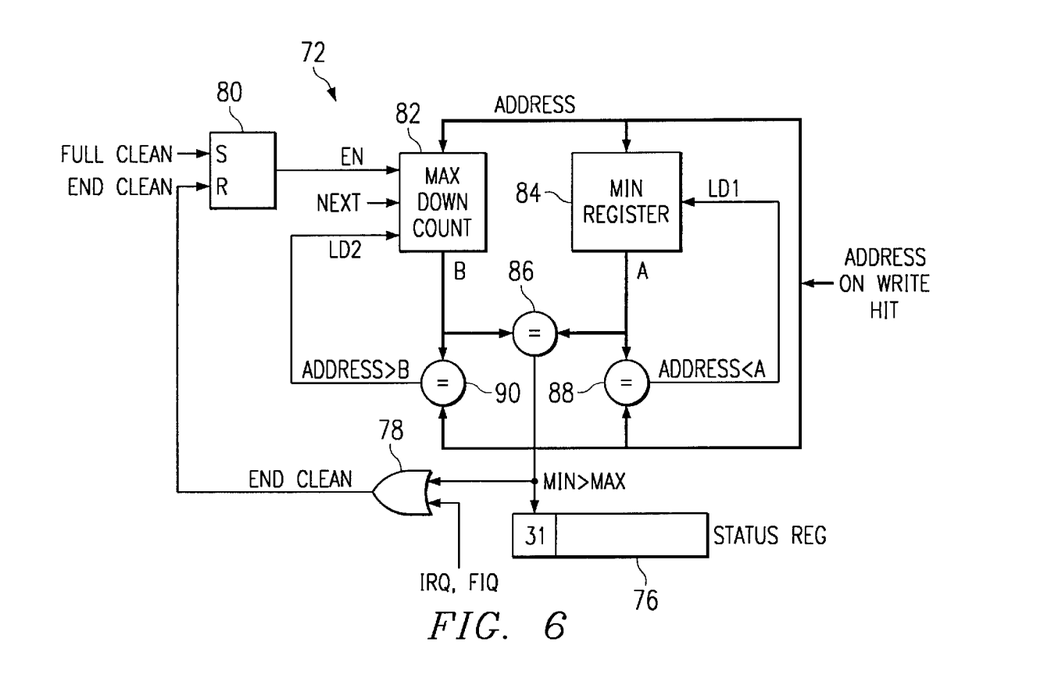
FIG. 6 illustrates a block diagram of the address control circuitry from the cache controller of FIG. 5.

FIGS. 5 and 6 illustrate a block diagram of an embodiment for performing the hardware clean described above. A cache controller 70 receives a FULL CLEAN signal and END CLEAN signal. The FULL CLEAN and END CLEAN signals are received by address control circuitry 72. Address control circuitry 72 outputs a cache address and a MIN>MAX signal to control logic 74. Control logic 74 is coupled to status register 76. Control logic 74 is coupled to cache memory 18. OR gate 78 receives the MIN>MAX signal and one or more interrupt signals.

In operation, the cache controller 70 receives address from the processor 14 (see FIG. 1) and controls the cache memory 18 to receive and send data to the processor 14, as appropriate. Cache controller 70 performs all the functions of a typical cache control circuit, in addition to providing the hardware clean function described above. The address control circuitry 72 maintains the MIN register 84 and MAX counter 82 as described in connection with FIG. 4. The output of the address control circuitry 72 (the value of the MAX counter) specifies the address of the next cache entry to check and save back to main memory 16 is the entry is dirty. The MIN>MAX signal is output to indicate whether the value of the MIN register is greater than the present value of the MAX counter.

After a FULL CLEAN signal is received, the MAX counter 82 contains the address of the highest entry in the cache 18 which may be dirty. The output of the MAX counter 82 is received by the control logic 74. After the tag memory 22 of the entry is checked by the control logic 74 to see if the entry is dirty, and after the entry is saved to main memory 18 in the case where the dirty bit is set, the MAX counter 82 is decremented to the next lower address. The process of checking the dirty bit associated with the entry specified by the MAX counter 82, saving the entry to the main memory 16 if the dirty bit is set, and decrementing the MAX counter 82 is repeated until either and interrupt signal is received or the MIN register value is greater than the MAX counter value. If either condition occurs, the END CLEAN signal is output from OR gate 78 which stops further cleaning by the address control 72 and the control logic 74, but maintains the current values of the MAX counter 82 and the MIN register 84.

FIG. 6 illustrates an embodiment of the address control circuitry 72 in greater detail. The FULL CLEAN and END CLEAN signals are received by set-reset (SR) flip-flop 80. The output of flip-flop 80 is the enable (EN) signal which allows MAX counter 82 to be decremented on each cycle. A NEXT signal is received by the MAX counter 82 from the control logic 74 at the end of each write back to main memory 16 during the cleaning function to decrement the counter for the next cache address. The output of MIN register 84 and the output of MAX counter 82 are coupled to inputs of comparator 86, respectively. The output of comparator 86 is the MIN>MAX signal. The virtual address is coupled to inputs to the MAX counter 82, to the MIN register 84, to one input of comparator 88, and to one input of comparator 90. The input of MAX counter 82 is coupled to the other input of comparator 90 and the output of MIN register 84 is coupled to the other input of comparator 88. The output of comparator 88 indicates whether the current address for a write hit is less than the output of the MIN register 84 and is connected to the load (LD1) input of the MIN register 84. The output of comparator 90 indicates whether the current address for a write hit is greater than the output of the MAX counter 82 and is connected to the load (LD2) input of the MAX counter 82.

In operation, if the MAX counter 82 is enabled, it will decrement each time it receives a NEXT signal from the control logic. The flip-flop 80 is set (EN is true) when a FULL CLEAN signal is received from the processor to continue (or start) the hardware clean function and is reset (EN is false) when the END CLEAN signal is received, either because of interrupt or the end of the clean operation. Once the flip-flop 80 is reset, the counter will stop decrementing and the cleaning will cease until another FULL CLEAN signal is received.

Comparators 88 and 98 load the MIN register 84 and MAX counter 82, respectively, during normal operation of the cache memory 16. If the address on a write hit is greater than the current value of the MAX counter 82, the output of comparator 90 will cause the address (or appropriate portion thereof) to be loaded into the MAX counter. Similarly, if the address on a write hit is less than the current value of the MIN register 84, the output of comparator 88 will cause the address (or appropriate portion thereof) to be loaded into the MIN register 84.

While a specific preferred embodiment of the invention has been shown herein, many variations could be implemented, as would be known in the art. For example, rather than cleaning entries from the top dirty cache locations to the bottom dirty cache location, the illustrated embodiment could easily be modified to clean entries in the opposite direction by using an incrementing counter for the MIN entry and storing the MAX entry in a register. While the circuitry for maintaining a range of existing dirty locations in the cache is shown as part of the cache control logic, this circuitry could be part of another subsystem or it could be a separate subsystem. Depending upon the processing and memory architecture used in a particular device, such as multiprocessor, processor and co-processor, bifurcated data and instruction memories, and so on, deviation may be warranted from the architecture illustrate herein, as would be known in the art. Caching techniques which differ from the particular 2-way set associative caching technique described herein could also be used with the present invention.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A digital system comprising a processor coupled to main memory and a cache memory with dirty bits and having control circuitry for performing a hardware clean function, the control circuitry comprising:

high circuitry for storing a highest address representative of a highest cache location having dirty data, wherein the high circuitry is operable to compare a pending address of each access to the cache that sets a dirty bit and to update the highest address if the pending address is higher than the current highest address;

low circuitry for storing a lowest address representative of a lowest cache location having dirty data, wherein the low circuitry is operable to compare the pending address of each access to the cache that sets a dirty bit and to update the lowest address if the pending address is lower than the current lowest address;

control logic circuitry for writing information from the cache to corresponding main memory locations for each dirty cache location in a range between the lowest address and the highest address in response to a clean function command; and wherein the control logic circuitry is responsive to the detection of an interrupt to halt the clean function, and to then resume the clean function at a later time.

2. A method for performing a hardware cache clean function in a system with a cache memory and a main memory, comprising the steps of:

keeping a record of a highest cache location having dirty data and a lowest cache location having dirty data to form a dirty range of cache locations having potentially dirty cache locations;

updating the record each time an access is made to the cache that creates a dirty location;

receiving a function command to clean the cache, and then under control of an autonomous hardware controller performing the steps of:
  generating a series of cache addresses in a predetermined order within the dirty range;
  writing information from each cache location in the dirty range to a corresponding main memory location if the information at the cache location is dirty; and
  disabling the series of generated cache addresses responsive to an interrupt and retaining a range indication of a remaining dirty range.

3. The method of claim 2, further comprising the step of resuming the steps of generating and writing using the retained remaining dirty range, such that the clean function can continue from where it was interrupted.

4. The method of claim 3, further comprising the step of checking the range indication to determine if the dirty range is non-zero and then only performing the step of resuming if the dirty range is non-zero.

* * * * *